United States Patent Office 3,497,854
Patented Feb. 24, 1970

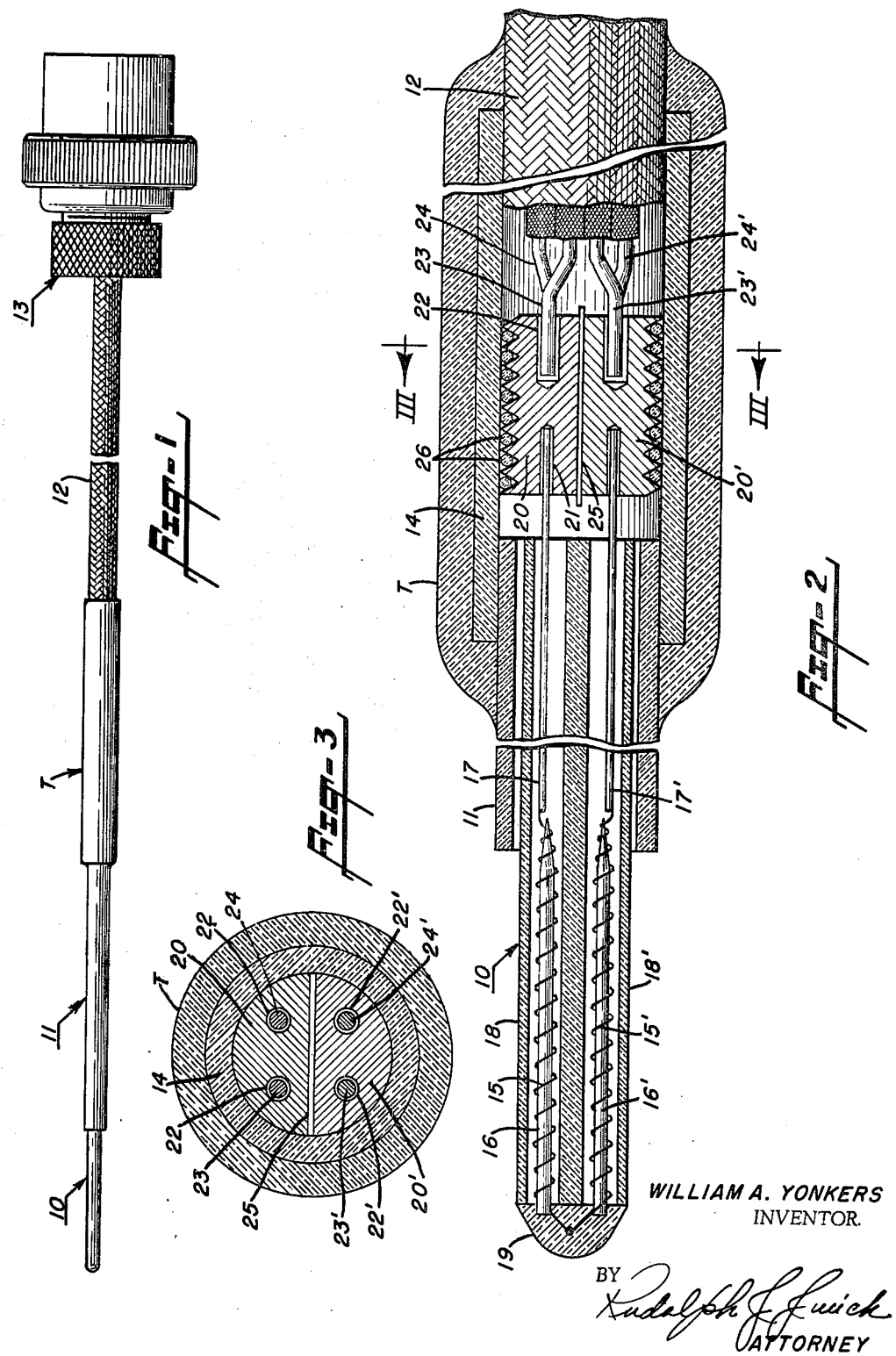

3,497,854
ELECTROTHERMAL DEVICE
William A. Yonkers, Mountain Lakes, N.J., assignor to RFL Industries, Inc., Boonton, N.J., a corporation of New Jersey
Filed May 25, 1965, Ser. No. 458,557
Int. Cl. H01c 7/00
U.S. Cl. 338—28
8 Claims

ABSTRACT OF THE DISCLOSURE

The ends of two dissimilar metal wires are electrically connected to metal members having a substantial mass and good heat conductivity, thereby to form two joints of an electrothermal device. The metal members are electrically insulated from each other and have flat surfaces positioned in close proximity to each other to effect good heat transfer therebetween.

---

This invention relates to electrothermal devices having two joints of dissimilar metals and more particularly to an arrangement for equalizing the temperature at the joints thereby to prevent the generation of spurious thermal voltages.

Although the invention may be used to advantage in various electrothermal devices for converting temperature changes to corresponding changes in an electrical factor, it will be described with specific reference to a resistance-type temperature sensing probe. Such probe comprises a resistance wire generally disposed within a housing, the ohmic value of which varies with the temperature of the surrounding medium. The resistance wire has leads connected thereto, preferably made of copper, whereby the wire is connectable to an electrical circuit positioned at a point remote from a furnace, or other device, for the purpose of measuring and/or controlling the temperature thereof. The two joints, between the lead wires and the resistance wire, being of dissimilar metals, may generate unequal thermal voltages arising by reason of temperature differences. Such temperature differences are due to different heat dissipation rates of the two leads in their temperature gradient environment, which condition is most pronounced at high temperatures, or when a large temperature difference exists between the ambient temperature and that of the medium being measured. The thermal voltages are variable and, therefore, cannot be compensated for in the electrical circuit.

An object of this invention is the provision of an arrangement to eliminate the development of spurious effects arising by reason of temperature differences in an electorthermal device which includes physical joints of dissimilar metals.

An object of this invention is the provision of an electrothermal device having two joints formed of dissimilar metal wires and wherein the joints are maintained at the same temperature under conditions wherein the wires have different heat-dissipation rates.

An object of this invention is the provision of a temperature-sensing probe comprising a resistance wire made of one metal, lead wires made of another metal and joined to the ends of the resistance wire, and means for maintaining the two joints at equal temperature.

An object of this invention is the provision of a temperature-sensing probe comprising a sensing element, a pair of lead wires, a pair of members made of a metal having good thermal conductivity, each member being connected between an end of the sensing element and a lead wire, and means for retaining said members in close proximity but electrically insulated from each other.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is a plan view of a temperature sensing probe incorporating heat equalizing means in accordance with this invention;

FIGURE 2 is a fragmentary longitudinal cross-sectional view of the probe drawn to an enlarged scale; and FIGURE 3 is a cross-sectional view taken along the line III—III of FIGURE 2.

Referring now to the drawings, the probe comprises a tubular tip 10 (which carries the fine wire sensing element), an intermediate tube 11, and a flexible cable 12 terminating in a conventional screw-type connection plug 13. The cable 12, carrying insulated copper lead wires and having an outer braid covering made of Pyrex glass, extends into and is secured to an end of a third tube 14 by a multi-layer wrapping of glass tape identified by the letter T. For use at high temperatures, the tubes 10, 11 and 14 are made of Pyrex glass.

As shown in FIGURE 2, the sensing element of the probe comprises two, fine platinum wires wound into helical coils 15 and 15′ about the glass rods 16, 16′. Several end convolutions of the coils are wound around the tapered ends of the rods and the ends are welded to relatively heavy platinum lead wires 17, 17′.

The tip 10, carrying the two helical coils which comprise the sensing element of the probe, consists of two, thin-walled tubes 18 and 18′, which tubes have been fused together longitudinally to form an integral unit. The maximum outside dimension of the unit is such that it is spaced slightly from the inner wall of the intermediate tube 11.

The other ends of the helical coils 15, 15′ are welded together and a glass bead 19 is fused over the joint and to the ends of the glass tubes 18, 18′, as well as to the protruding ends of the glass rods 16, 16′.

Disposed within the tube 14 and spaced from the end of the intermediate tube 11 is a thermal shunt, which comprises a cylindrical copper or silver rod having an external thread and which has been cut longitudinally along a diameter to form the matched members 20 and 20′. The member 20 is provided with a longitudinally-extending bore 21 receiving an end of the relatively heavy platinum wire 17 and a pair of bores 22 receiving the stripped ends of the two copper lead wires 23, 24 of the braided cable 12. The wires 23 and 24 preferably are silver-clad wires and these wires, as well as the wire 17, are soldered, or brazed, to the copper member 20. The matching copper member 20′ is provided with similar bores receiving the ends of the platinum wire 17′ and the ends of the silver-clad, copper lead wires 23′, 24′. The four wires 23, 24 and 23′, 24′ have their other ends soldered to spaced, electrically-insulated sockets of the connector 13, see FIGURE 1, whereby the probe can be connected into a Mueller bridge for temperature measurements.

After the wires have been soldered to members 20 and 20′, a thin sheet of mica 25, having a thickness of about .002 inch, is inserted between the two matching copper members 20, 20′, and the assembly is bound together by a Pyrex glass thread 26 which is wound tightly around the two members along the threads. Multiple layers of glass tape are then wound tightly over the tube 14 and over a portion of the glass tube 11 and the flexible cable 12. Such tape portion, indicated by the letter T, constitutes a handle for the probe.

The platinum wire coils 15, 15' each have the same number of convolutions and a predetermined resistance, thereby comprising a non-inductive sensing element uneffected by varying external magnetic fields.

In the described construction, the probe tip 10 is spaced from the inner wall of the intermediate tube 11. This allows for a small, lateral displacement of the exposed tip relative to the tube 11, thereby to absorb small mechanical shocks which otherwise might fracture the glass tip.

The thermal shunt, comprising the members 20 and 20', is relatively massive compared to the wires secured thereto and is a good heat conductor. In the case of a thermal gradient existing along and/or across the probe, the members 20, 20', being separated only by a very thin sheet of mica, provide a rapid heat transfer thereby maintaining all of the wire ends at the same temperature. This eliminates the generation of thermal voltages which normally occurs when different temperatures exist in the immediate region of a joint made between dissimilar metals.

Having now described the invention, those skilled in this art will be able to make various changes and modifications in the illustrated construction and arrangement of the parts, without thereby departing from the spirit and scope of the invention as recited in the following claims.

I claim:
1. In an electrothermal device of the class incorporating dissimilar metal wires having ends electrically connected together to form two joints, the improvement wherein the ends of the dissimilar wires are secured to matching metal members mechanically secured together but electrically insulated from each other, said members having good heat conductivity and a substantial mass relative to the wire ends, and said members having flat surfaces spaced apart approximately 0.002 inch for good heat transfer therebetween.

2. An electrothermal device comprising:
 (a) a resistance wire of one metal disposed within a housing,
 (b) a pair of lead wires of another metal and having ends disposed in said housing,
 (c) a pair of heat-equalizing members having a substantial mass and made of metal having high heat conductivity, said members having flat surfaces spaced apart approximately 0.002 inch for good heat transfer therebetween, each of said members being connected to an end of the resistance wire and a lead,
 (d) means electrically insulating the said members from each other, and
 (e) means securing together the said members.

3. The invention as recited in claim 2, wherein said heat-equalizing members are provided with external threads and wherein the members are secured together by a non-conducting filament disposed in the threads.

4. The invention as recited in claim 2, wherein said heat-equalizing members comprise two halves of an externally-threaded rod, wherein each member is provided with spaced, longitudinally-extending bores receiving an end of the lead and an end of the resistance wire, and wherein the members are secured together by a non-conducting filament wrapped around the external threaded portions thereof.

5. The invention as recited in claim 4, wherein the means electrically insulating the said members is a thin sheet of electrical insulating material disposed between the members.

6. A temperature-sensing probe comprising:
 (a) a tubular housing terminating in a closed tip,
 (b) a pair of copper lead wires extending from one end of the housing,
 (c) a wire sensing element of a different metal disposed in said tip,
 (d) means connecting the ends of the lead wires to the sensing element, said means comprising two matching metal members in the form of half cylinders having their flat surfaces disposed in close proximity to each other, said members having substantial mass and good heat conductivity,
 (e) means electrically insulating the said members from each other, and
 (f) means securing together the said members.

7. The invention as recited in claim 6, wherein the said members comprise two halves of an externally-threaded rod and the lead wires have ends disposed in longitudinal bores formed in said members; wherein said members are secured together by a non-conducting filament disposed in the threaded portions of the members; and including intermediate leads made of the same metal as the sensing element, said intermediate leads each having an end connected to an end of the sensing element and the other end disposed in other longitudinally-extending bores formed in the said members.

8. A temperature-sensing probe comprising:
 (a) a pair of glass tubes secured in side-by-side relation,
 (b) a sensing element comprising a pair of helical, wire coils having ends joined together, each coil being disposed in one of the said tubes,
 (c) an intermediate glass tube having one end extending over a portion of the said pair of tubes,
 (d) intermediate leads made of the same wire as the helical coils and connected to the other ends thereof,
 (e) a pair of temperature-equalizing members made of metal having a good thermal conductivity, said members comprising two longitudinal sections of an externally-threaded rod,
 (f) a pair of lead wires, one each of said lead wires and one each of said intermediate leads being connected to one each of said temperature-equalizing members,
 (g) a thin sheet of electrical insulating material disposed between the said members,
 (h) a non-conducting filament wrapped around the threaded portions of said members thereby to secure them together, and
 (i) a glass tape wrapped around the said members and extending over proximate portions of the said intermediate glass tube and said lead wires.

References Cited

UNITED STATES PATENTS

| | | | |
|---|---|---|---|
| 2,149,448 | 3/1939 | Lederer et al. | 338—28 |
| 2,379,530 | 7/1945 | Lederer | 338—28 |
| 2,450,263 | 9/1948 | Wise | 338—28 |
| 2,988,718 | 6/1961 | Muehlner | 338—28 |
| 3,295,373 | 1/1967 | Boddy | 338—28 X |
| 2,120,335 | 6/1938 | Lederer | 338—30 X |

REUBEN EPSTEIN, Primary Examiner

U.S. Cl. X.R.

338—29